W. G. CRUSH.
METHOD AND APPARATUS FOR VULCANIZING TIRES.
APPLICATION FILED JAN. 28, 1920.

1,357,617.

Patented Nov. 2, 1920.
2 SHEETS—SHEET 1.

Inventor
W. G. CRUSH,

By H. Woodward
Attorney

W. G. CRUSH.
METHOD AND APPARATUS FOR VULCANIZING TIRES.
APPLICATION FILED JAN. 28, 1920.
1,357,617.
Patented Nov. 2, 1920.
2 SHEETS—SHEET 2.
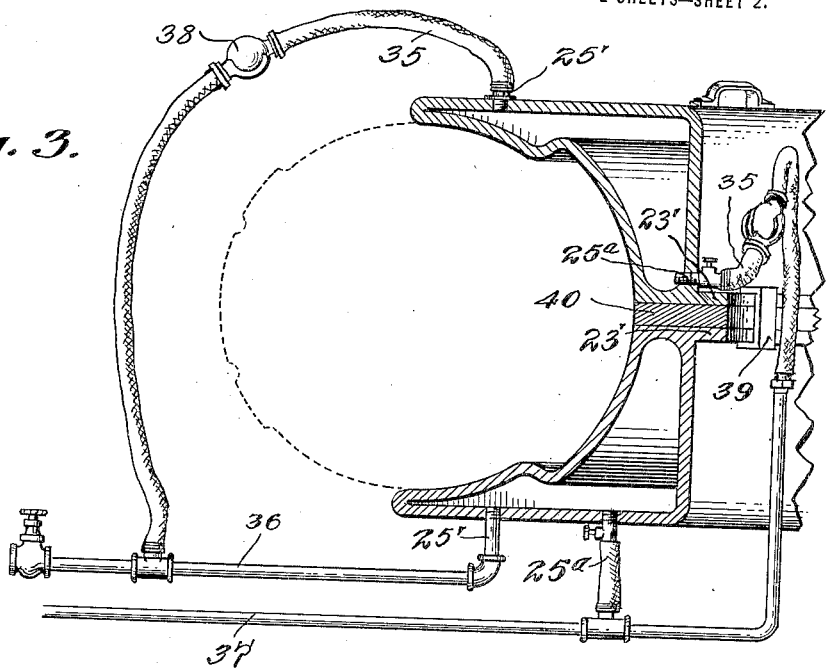
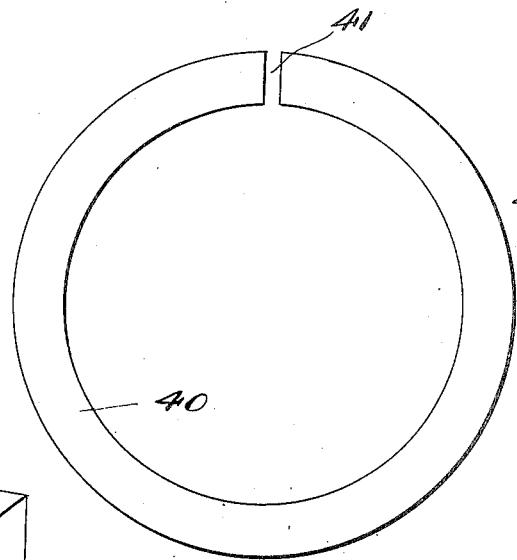
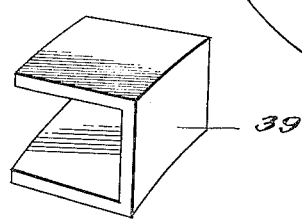
Inventor
W. G. CRUSH.
By H. Woodward
Attorney

UNITED STATES PATENT OFFICE.

WILLIAM G. CRUSH, OF MUSKOGEE, OKLAHOMA.

METHOD AND APPARATUS FOR VULCANIZING TIRES.

1,357,617.   Specification of Letters Patent.   Patented Nov. 2, 1920.

Application filed January 28, 1920. Serial No. 354,539.

*To all whom it may concern:*

Be it known that I, WILLIAM G. CRUSH, a citizen of the United States, residing at Muskogee, in the county of Muskogee and State of Oklahoma, have invented certain new and useful Improvements in Methods and Apparatus for Vulcanizing Tires, of which the following is a specification.

The invention has for an object to give an improved molding device adapted to be used with tires of various sizes for certain special operations in the pneumatic rubber tire industry.

It is one of the recent developments in this art to apply a reinforcing tread portion to the ordinary pneumatic shoe, the tread portion having tapered or attenuated portions extending for a distance on each side which are adapted to cover the shoe as far as the bead, or partly over the bead. These devices may be applied to new tires, but generally are used to renew the tread on worn shoes, and are often termed "half soles." The device has ordinarily been secured by means of cement, and is often vulcanized, in addition, provided the necessary mold is available. Ordinarily a mold such as the tire was originally molded in has been employed.

Tire molds heretofore made encompass the whole shoe, and in the operation heat is applied equally to the entire body of the shoe.

It is well understood that in the making of a tire, vulcanization carried to the proper length assures the maximum life to the rubber, and that excessive vulcanization then detracts from the efficiency of the rubber, causing it to wear more rapidly. Therefore, in the application of supplementary treads to old shoes, by vulcanization, the rubber structure of the shoe has been detrimentally affected. Where the maximum strength is required in the shoe, is in the outer or road engaging portion, and the side portions, and as there is very little rubber in the base portion of the walls of the shoe, the effect of vulcanization there has the least damaging results.

I have discovered that by cementing such a tread upon an old shoe and vulcanizing it only at the edge portion near the base of the shoe and adjacent the bead, the tread will remain in place firmly, and give much more efficient service than where vulcanization is applied throughout the body of the shoe.

It is therefore an object of my invention to give means whereby supplementary treads may be vulcanized upon shoes by the application of heat at the lower parts of the shoe only, and in an efficient manner.

Additional objects, advantages, and features of invention will appear from the construction, arrangement and combination of parts hereinafter described and shown in the drawings, wherein, Figure 1 is a fragmentary perspective view of a mold constructed in accordance with my invention, Fig. 2 is a cross sectional view of the mold.

Fig. 3 is a view of a modification of the device.

Figs. 4 and 5 are details.

Figure 1:
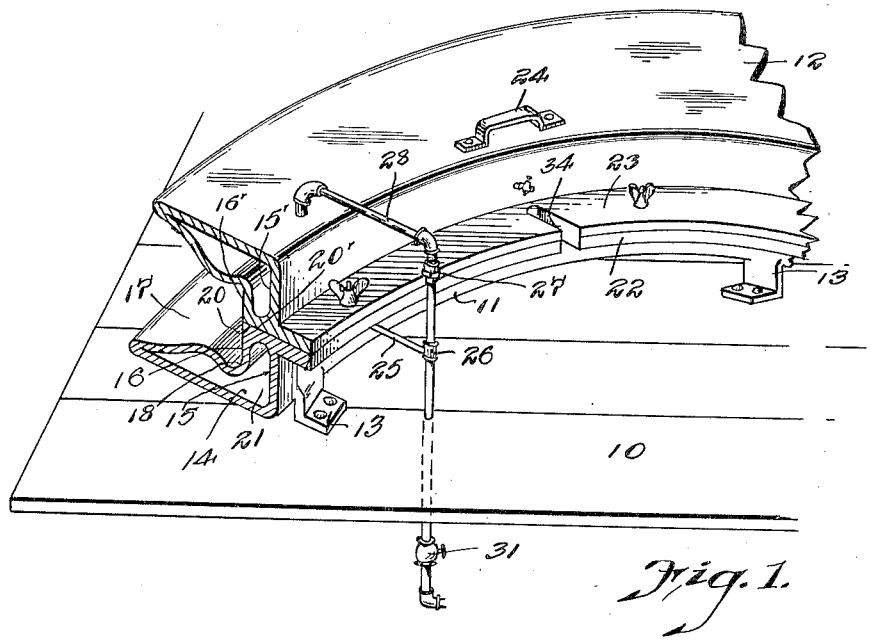
Figure 2:
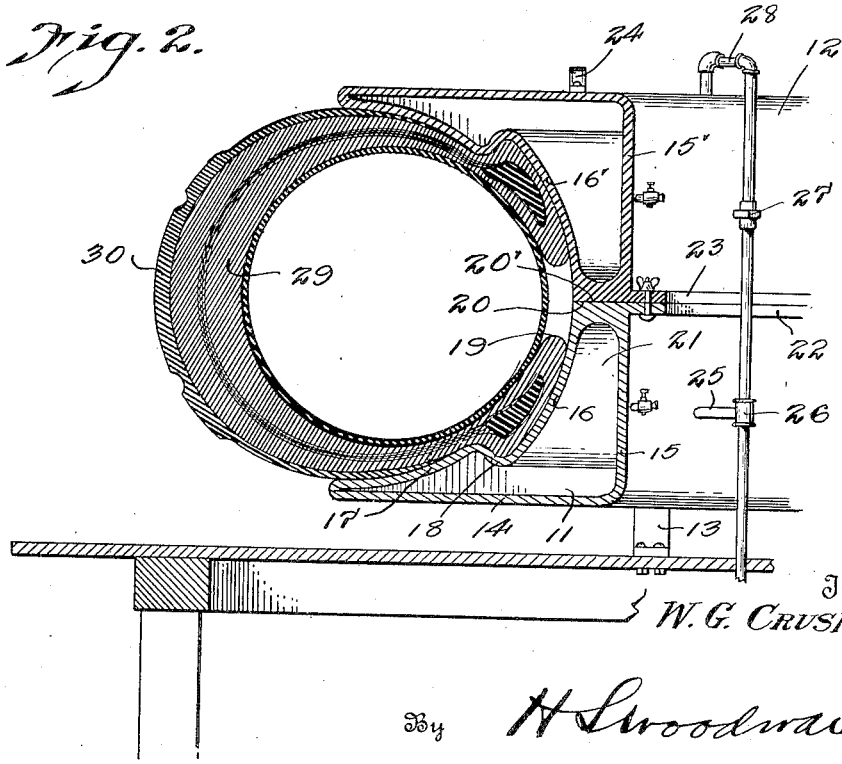

There is illustrated a bench top 10 upon which there is secured the lower annular mold section 11, upon which there is superposed a mold section 12 substantially identical excepting the omission of mounting feet 13 which are cast integral with the lower section of the mold. The mold section 11 is formed with a lower horizontal wall 14, which is held spaced a distance above the bench by the feet 13, an inner cylindrical wall 15 extending upwardly from the wall 14, while a connecting wall 16 extends between the two, this wall conforming to the shape of a pneumatic tire shoe including the lower side wall portion 17 and bead 18 as far as the inner edge 19. The mold section 11 is formed with a planiform face 20, formed as a part of the wall 16, the conformation of which is such as to leave an ample steam space 21 between the bead and wall 15 of the mold, as shown. At the inner side of the wall 15 a flange 22 is extended horizontally, its upper side being flush with the surface 20 before mentioned. The mold section 12 is formed with a corresponding planiform face 20' and flange 23 adapted to be bolted snugly against the corresponding part of the mold section 11, while wall portions 15' and 16' extend upwardly, the first alined with the wall 15 before mentioned, while the second is arranged in the proper relation to the wall 16 to engage the side and bead portions of a shoe, the opposite parts of which are engaged in the lower mold section. One or more handles such as indicated at 24 may be provided for lifting the mold section 12 out of operative position. The legs 13 are secured upon the bench 10, and a permanent steam supply connection is made with the lower mold section as indicated at 25, this being an extension from a T 26 from which the feed line extends vertically a distance above the level of the flanges 22 and 23, where any suitable form of quick operating coupling or union 27 is provided from which a steam line 28 is carried into the upper side of the mold section 12.
In operation, a shoe indicated at 29 having been suitably cleaned and otherwise prepared, the supplementary tread indicated at 30 is applied thereto with a cement of suitable strength; in practice, a vulcanizing cement has been employed for securing the tread at all points of contact with the shoe. The tread 30 may be extended as far as desired upon the bead portion or may stop short of the bead, in accordance with the practice found most expedient or as developed in the art. The mold section 12 being moved to one side, the steam supply having been cut off at 31 and the coupling 27 disconnected, the tire with the applied tread is laid around and upon the lower section 11 of the mold, and a suitable inflatable tube or other device then engaged in the shoe, although it may be put in place therein at any other time that may be found more advantageous. The mold section 12 is then put in place over the shoe and secured upon the mold section 11, the coupling 27 connected the inflatable element inflated to a suitable pressure, and the steam supply admitted to the mold for the desired length of time to properly vulcanize the side portions of the tread 30 upon the shoe 29.

It is found that in practice the friction developed in the use of the tire serves to vulcanize the cement under the outer tread portion, before the latter has worn to such an extent as to be easily displaced from the shoe surface. This is not an essential result however, as ordinary cement of various other kinds serve well to hold the tread material in place.

For applying pressure within the shoe 29 while the tread is being vulcanized thereon an ordinary inner tube may be employed, with a valve portion that may be projected inwardly between the mold sections 11 and 12, slots 34 being left in the flanges 22 and 23 and adjacent opposing portions of the mold for this purpose.
One mold is adapted to use with several different sizes of tires, the cross sectional diameter of the shoe not affecting the proper application of pressure between the shoe and mold. The mold is preferably made of a form to engage the smaller sizes of tires with sufficient snugness, and the larger sizes will then readily accommodate themselves in the device.

It is not necessary that the inner edges of the shoe be brought together in this device and on this account allowance may be made to accommodate bead portions of different sizes.

In Fig. 3 there is shown a modification of the mold and a preferred method of clamping the mold sections together, as well as a quick detachable steam coupling and vapor device. The mold elements are otherwise formed the same as before described, including a flange portion 23'. Each section is formed with inlet fittings 25' and outlet connections 25ᵃ. From each of these on the upper section of the mold, there is led rubber hose 35 extending to suitable supply pipes 36 and return pipes 37. In the flexible hose line a quick detachable coupling 38 may be incorporated in each line of hose, at a suitable point, this coupling comprising a construction such as is ordinarily used in feed couplings for railway trains between the cars, appliances of this kind being familiar upon the market. In order to secure the mold sections together, clamping devices 39 are provided, in the form of U-shaped elements having respective arms adapted to slide snugly over the flanges 23' when the mold sections are put together. These clamps have their arms spaced so as to bear lightly upon the flanges when initially put into place, so that they may be readily slipped on and off. No great pressure is required between the mold sections where they mutually engage.

In order to enable the ready adaptation of the device to use with very large sizes of shoes, I provide a split ring 40, having planiform parallel upper and lower surfaces adapted to be snugly engaged between those faces of the mold which ordinarily coengage when the device is used upon smaller shoes. The slit 41 in the ring is sufficiently wide to permit the passage of the valve for the inflating tube by which the shoe is expanded in the mold during the vulcanizing operation. Larger and smaller clamps 39 will be required of course, for use with and without the ring 40.

What is claimed:

1. A mold of the character described comprising two annular elements constructed to be brought into coengagement in opposition upon opposite sides of a tire shoe, and having form and size to engage the bead and lower side portions of the shoe, and means for supplying heat thereto whereby material extending part way up the side of a shoe may be vulcanized, the terminal outer edges of said annular element being rounded.

2. A device of the character described comprising an annular mold section having legs constructed to support it spaced above a table top, a corresponding upper mold section adapted to be secured thereupon, both being formed to engage the lower side and bead portion of a tire shoe, a fixed steam duct connection to the lower section, and a movable connection with the upper section.

3. The method of reinforcing the shoe of a pneumatic tire consisting in cementing a tread element upon the shoe with portions extending upon the inner side portions of the shoe, and applying pressure to the entire inner surface of the shoe, and to the outer part of the lower side portions and bead only, and subjecting the lower side portions to the action of vulcanizing heat.

In testimony whereof I have affixed my signature in presence of two witnesses.

WILLIAM G. CRUSH.

Witnesses:
H. L. ROSE,
A. H. DAVIDSON.